United States Patent
Hoffmann et al.

[11] 3,938,026
[45] Feb. 10, 1976

[54] CIRCUIT FOR THE SIMULTANEOUS IGNITION OF A PLURALITY OF THYRISTORS

[75] Inventors: Manfred Hoffmann; Jakob Schenk, both of Erlangen; Karl-Friedrich Leowald, Weiher, all of Germany

[73] Assignee: Siemens Aktiengesellschaft, Munich, Germany

[22] Filed: Nov. 4, 1974

[21] Appl. No.: 520,849

[30] Foreign Application Priority Data
Nov. 21, 1973 Germany............................ 2358091

[52] U.S. Cl. ......... 321/27 R; 307/252 L; 307/252 R
[51] Int. Cl.² ............................................. H02M 7/12
[58] Field of Search .......... 307/239, 240, 246, 252, 307/252 L; 321/27 R, 43; 323/36, 39, 22 SC, DIG. 1

[56] References Cited
UNITED STATES PATENTS

| | | | |
|---|---|---|---|
| 3,331,999 | 7/1967 | Dinger | 323/22 SC X |
| 3,376,492 | 4/1968 | Morgan et al. | 321/43 |
| 3,385,973 | 5/1968 | Abrams et al. | 321/47 X |
| 3,723,847 | 3/1973 | Chaupit | 321/27 R |
| 3,761,796 | 9/1973 | Jensen | 323/17 X |
| 3,772,532 | 11/1973 | Petrov et al. | 307/252 L |
| 3,849,670 | 11/1974 | Lourigan | 323/DIG. 1 X |

FOREIGN PATENTS OR APPLICATIONS
2,019,933    4/1970    Germany .............................. 321/47

*Primary Examiner*—William M. Shoop
*Attorney, Agent, or Firm*—Kenyon & Kenyon Reilly Carr & Chapin

[57] ABSTRACT

The invention relates to a circuit arrangement for the simultaneous ignition of a plurality of thyristors. Control paths of the thyristors are each connected to a secondary winding of a pulse transformer by way of a separate full-wave rectifier, an alternating current of higher frequency being supplied to the primary winding of the pulse transformer by a control current amplifier. In order to obtain a continuous flow of control current when a control signal is given, it is provided, according to the invention, that there is connected to the control path of each thyristor the series arrangement of a storage reactance coil and an uncontrolled diode poled in the direction of the gate current, and that the output of the full-wave rectifier is connected to this uncontrolled diode.

10 Claims, 3 Drawing Figures

CIRCUIT FOR THE SIMULTANEOUS IGNITION OF A PLURALITY OF THYRISTORS

BACKGROUND OF THE INVENTION

1. Field of the Invention

The invention relates to a circuit arrangement for the simultaneous ignition of a plurality of thyristors connected in series, the control paths of which are connected, by means of a full-wave rectifier, to a secondary winding of a common pulse transformer, the primary winding of which is supplied an alternating current of higher frequency by a control current amplifier.

2. Description of the Prior Art

Such a circuit arrangement is known, for example, from the German Offenlegungsschrift 1,563,395 or from the German Offenlegungsschrift 2,638,637. Therein, the individual thyristors are components of a high-voltage converter. At least one high-voltage cable enclosing the magnet core or cores is used as primary winding for one or more pulse transformers. The secondary windings are connected, by means of full-wave rectifiers, to the control paths of the individual thyristors directly, i.e., without further wiring. By means of a coil between the high-voltage cable to the secondary winding and to rectifier, firing information and the firing energy for each transistor are jointly magnetically transformed.

In this arrangement, much firing energy is required for the ignition of a large number of thyristors. The high firing energy must be taken into account in the design of the control current amplifier. The inductance of the ignition circuit, must be considered because of the insulation spacings required. It is for this reason that a dc-ac converter feeding the high-voltage cable or cables is preferred to the control current amplifier in the known arrangements. This dc-ac converter is operated at a higher frequency, namely in the so-called medium frequency range. The medium frequency range extends essentially from 0.5 to 20 kHz.

Because of the operating mode of the dc-ac converters in common use for this purpose, the curve of the primary current supplied to the primary winding of the pulse transformer is not linear, but sine-shaped, for instance. Each half oscillation of the primary current is followed by a gap where no current flows lasting to the start of the next half oscillation in the opposite direction. The gap may be as wide as a half oscillation. The shape of the current in the secondary winding of the pulse transformer looks the same. After rectification in the full-wave rectifier there appears in the control path of the individual thyristors a gate current consisting of a succession of positive half oscillations with zero current intervals between them. Such a gate current curve may lead to the respective thyristor regaining its blocking ability in the zero current interval, despite the fact that a control signal continues to be applied to the control current amplifier and an ignition is desired.

It is an object of the invention to design a circuit described hereinbefore in such a manner that a sizable gate current flows in the control electrode of each thyristor fed by the common pulse transformer during the zero current gaps in the primary current curve. A non-zero gate current should flow also if the primary current is continuous, such as a sine-shaped curve.

SUMMARY OF THE INVENTION

The objective is met by connecting to the control path of each thyristor, the series arrangement of a storing reactance coil and an uncontrolled diode poled in the direction of the grid current, and that the output of the full-wave rectifier is connected to this uncontrolled diode.

In this circuit arrangement, the zero current intervals in the secondary current are bridged by a current which, due to the energy stored in the storage reactance coil, flows through this storage reactance coil, the control path of the thyristor and the uncontrolled diode.

It is advantageous to achieve a very high rate of change of the thyristor grid current at the moment of applying the control signal. This is usually accomplished by giving the individual half oscillations of the primary current a large amplitude and, therefore, slope steepness. According to another embodiment of the invention, it is possible by additional measures at the beginning of the control signal, to increase the slope steepness of the gate current versus the slope steepness of those half oscillations which are induced in the secondary winding of the pulse transformer by paralleling to the storage reactance coil the series arrangement of a capacitor to which a discharge resistor is paralleled, and a cutoff diode. This series arrangement is a bypass of the storage reactance coil. At the beginning of the control signal, the capacitor takes over the gate current. To make sure that the capacitor is discharged at the beginning of the control signal, the discharge resistor is in parallel with it. In the course of the continuing control signal the capacitor is being charged, and the gate current flows increasingly through the storage reactance coil.

According to another embodiment of the invention, a further increase in slope steepness of the gate current can be achieved by disposing parallel to the output of the full-wave rectifier a charge capacitor, a parallel discharge resistor for this charge capacitor, and a series connection of a threshold value element and the uncontrolled diode. A Zener diode may be provided as threshold value element. It is also possible to use as a threshold value element a series arrangement of diodes poled in the foreward direction of the gate current. The interaction of the charge capacitor and threshold value elements assures that capacitor voltages above a predetermined limit only lead to the formation of a gate current. At the same time, the charge capacitor serves the purpose of interference suppression. Lower interference voltage coupled to the circuit arrangement capacitively or inductively, for instance, can thus not lead to an ignition of the thyristor.

DESCRIPTION OF THE INVENTION

Figure 1:
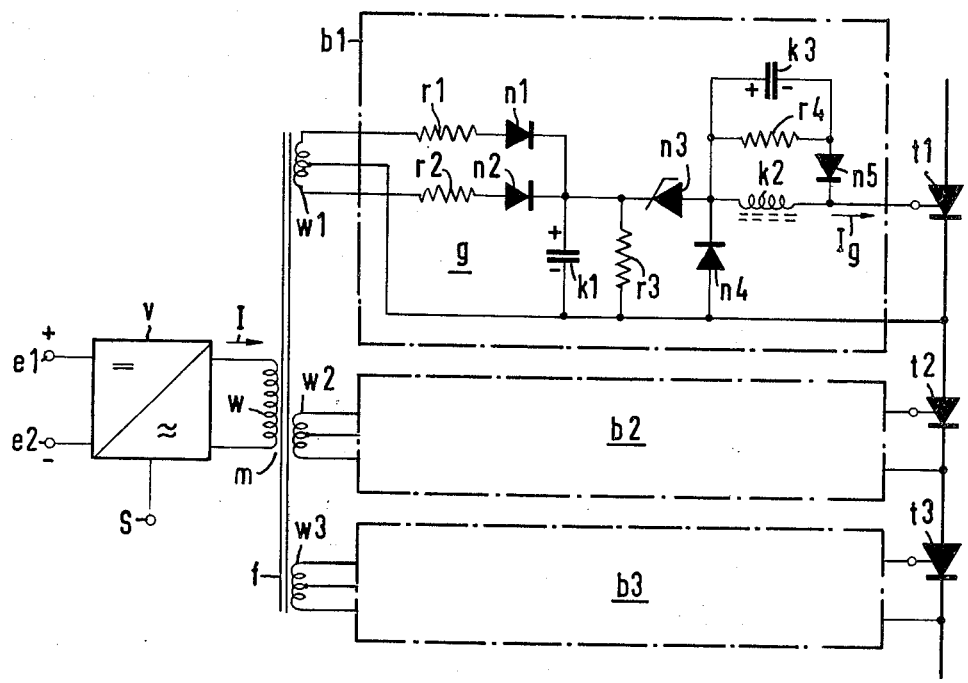
FIG. 1 shows a schematic circuit arrangement of the invention.

FIG. 1 shows a circuit arrangement for the simultaneous ignition of a plurality of thyristors in series arrangement, of which only three thyristors $t1$, $t2$ and $t3$ are shown, however. These thyristors $t1$, $t2$ and $t3$ form part of a high-voltage converter. A wiring arrangement $b1$, $b2$ and $b3$ connects their control paths to a secondary winding w1, w2 and w3, respectively, of a common pulse transformer m. Only the wiring arrangement b1 is shown in detail. The make-up of the other two wiring arrangements b2 and b3 is the same, and therefore shown in block form only. The primary winding of the pulse transformer m, the core of which has the reference symbol f, is supplied by a control current amplifier v with an alternating current of frequency in the medium frequency range. The primary current I can be turned on or off by a control signal S.

The common control current amplifier v is used for the generation of the power required to fire all thyristors t1, t2 and t3 to be fired simultaneously. In order to take into account the inductance of the wiring arrangements b1, b2 and b3, the control current amplifier v may be designed, in particular, as dc-ac converter with thyristors. A suitable dc-ac converter is described in the German Offenlegungsschrift 2,015,673, for example. The dc input terminals have the reference symbols e1 and e2. The control current amplifier v is thus capable of supplying much power. It can be turned on immediately by the control signal S and can also be turned off again quickly.

Figure 2A:
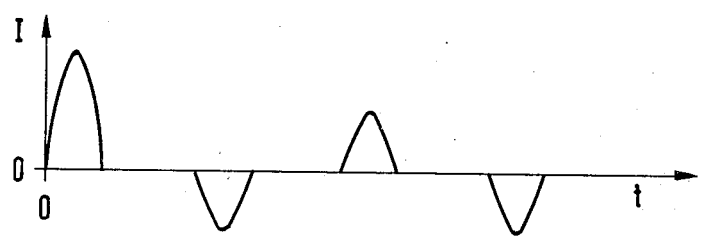
FIG. 2 shows two current-time diagrams, one for pulse current, and another for thyristor gate current.

The primary current I supplied is of a frequency approximately in the range between 0.5 and 20 kHz. Each period consists of a positive and a negative half oscillation, between which there is a zero current interval, as shown in FIG. 2a. The amplitude of the first half oscillation of the primary current I after the application of the control signal S is about twice that of the succeeding half oscillations. The secondary currents in the secondary windings w1, w2, w3 have the same time slope. The amplitude of the first half oscillation may be as high as 20 amps in the secondary windings w1, w2, w3.

The primary winding w of the pulse transformer may be a single or multiple ignition cable. It may further be provided that several transformer cores f, each with a number of secondary windings, are assigned to the primary winding w.

A secondary current of medium frequency is generated in the secondary winding w1 of the pulse transformer m. This secondary current is rectified by a full-wave rectifier g. The full-wave rectifier g in FIG. 1 is one with center-connected diodes n1 and n2. The full-wave rectifier g may also consist instead of a bridge circuit with uncontrolled diodes. Due to the use of a full-wave rectifier g, both current directions of the primary current I are utilized for the transformation of power for ignition.

In case of a short-circuit in the wiring arrangement b1, the currents in the other wiring arrangements b2 and b3 assigned to the same transformer core f would be severely influenced. To avoid this and to limit the short-circuit current, cutoff resistors r1 and r2, respectively, are disposed in series to the diodes n1 and n2 of the full-wave rectifier g. The resistance of the cutoff resistors r1 and r2 may be 2 Ohms, for example.

A charging capacitor k1 is connected in parallel to the output of the full-wave rectifier g. Its capacity may be from 0.5 to 1.5 $\mu f$, for instance. In parallel to it is a discharge resistor r3. Its resistance may be 300 Ohms, for instance. Also paralleled to the output of the full-wave rectifier g is the series arrangement of a threshold value element n3 and an uncontrolled diode n4. A Zener diode, for example, may be provided as threshold value element n3. Instead, a series arrangement of diodes may also be used as threshold value element n3. The anode of this series arrangement of diodes is then to be connected to the positive side of the storage capacitor k1. The threshold voltage of the threshold value element n3 may be 5 V, for example.

In general, the storage capacitor k1 and the threshold value element n3 may be designed so that a current flows through the threshold value element n3 and on through the rest of the wiring arrangement b1 only after 1/10 to 1/5 of the duration of a half oscillation of the secondary current in the secondary winding w1 has elapsed. After the first activation of the control current amplifier v, the onflowing current receives a higher slope steepness than the first half oscillation of the secondary current in the secondary winding w1 of the pulse transformer m. The charging capacitor k1 serves the purpose of storing the charge and at the same time of suppressing interference, for interference voltages below the threshold cannot lead to the release of a firing pulse in the control path of thyristor t1.

Connected to the control path of thyristor t1 is the series arrangement of a storage reactance coil k2 with the uncontrolled diode n4. The diode n4 is poled in the direction of the gate current $I_g$. To achieve, at the beginning of the control signal S, a great slope steepness of the gate current $I_g$, there is additionally connected in parallel to the storage reactance coil k2, the series arrangement of a capacitor k3 and a cutoff diode n5. The capacity of capacitor k3 is, for instance, 1 $\mu f$. The cutoff diode n5 protects the capacitor k3, when charged in the manner shown, against discharge across the storage reactance coil k2. The cathode of the cutoff diode n5 is connected to the control electrode of thyristor t1. In addition, a discharge resistor r4 is connected parallel to the capacitor k3. The resistance of the discharge resistor r4 may be as high as 500 Ohms. It assures that the capacitor k3 is discharged when a new control signal S arrives, which means that a new ignition of thyristor t1 is requested. If, at this moment, the capacitor k3 were still charged completely or partially, no adequate slope steepness of the gate current $I_g$ could be achieved for the new firing.

FIG. 2a shows the primary current I as a function of time t. It may be seen therefrom that zero current intervals exist between the individual half oscillations. The first half oscillation, originating at $t = 0$ upon the application of the control signal S, is of an amplitude approximately twice that of the next half oscillations. The secondary current induced in the secondary winding w1 looks the same. The first half oscillation, which, as mentioned above may have an amplitude as high as 20 A, starts charging the charge capacitor k1 which was initially completely discharged. When the capacitor voltage reaches the threshold of the threshold value element n3, a current starts flowing through this threshold value element n3. This current flows first through the parallel arrangement of capacitor k3 and discharge resistor r4 and through the cutoff diode n5, impacting the control electrode of the thyristor t1 with great slope steepness as grid current $I_g$.

Figure 2B:
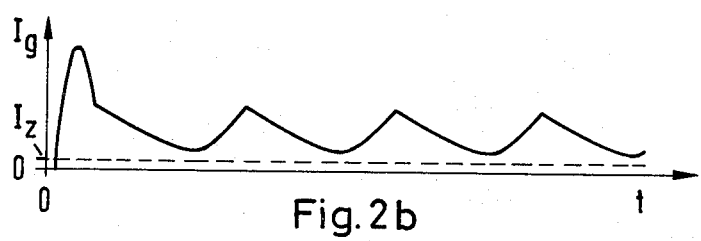

In FIG. 2b is shown the gate current $I_g$ as a function of time t. It may be seen therefrom that the grid current $I_g$ starts only a short time after $t = 0$ and that its slope steepness is greater than that of the primary current I in FIG. 2a. Consequently, it is also greater than that of the secondary current in the secondary winding w1. In accordance with the time integral of the capacitor voltage of capacitor k3, the component of the gate current $I_g$ flowing through the storage reactance coil k2 increases slowly. At the end of the first half oscillation of the primary current I, it is roughly three to four times the static ignition current $I_z$ required to fire the thyristor $t1$. This static ignition current $I_z$ is also shown in FIG. 2b.

During the next gap in the primary current I and, hence, also in the secondary current of the transformer $m$, the energy stored in the storage reactance coil $k2$ continues to drive a gate current $I_g$ through the control path of thyristor $t1$ and the uncontrolled diode $n4$. Therefore, the storage reactance coil $k2$ serves the purpose of bridging the currentless gaps. The values of the capacitor $k3$ and the storage reactance coil $k2$, the level of the secondary voltage transformed by the pulse transformer $m$, and the pulse frequency of the control current amplifier $v$ are selected in such a manner that, up to the start of the next half oscillation, the gate current $I_g$ of thyristor $t1$ is greater in any event than the static ignition current $I_z$ of this thyristor $t1$. This is evident from FIG. 2b.

Since the zero current gaps are eliminated by the circuit arrangement of FIG. 1, the individual thyristors $t1$, $t2$, and $t3$ of the high-voltage converter fire without interruption, as long as a control signal S is applied to the control current amplifier and as long as there is a high voltage. In other words, while a control signal S is applied, all thyristors $t1$, $t2$, and $t3$ of the series arrangement are activated simultaneously and without interruption. The case in which some of these thyristors $t1$, $t2$ and $t3$ are shut off and block in a currentless interval of the primary current I cannot occur. It is possible in this manner to master the dangerous gap operation in high-voltage converters.

In addition, there are relaxed design requirements of the control current amplifier, preferably designed as dc-ac inverter with thyristors. It can be operated with a smaller pulse frequency than was common practice heretofore. For, due to the bridging of the zero current intervals, the gap operation can be achieved at a lower pulse frequency without danger to the thyristors. The probability of the destruction of the thyristors in operation is thus reduced considerably.

Furthermore, commercially available thyristors can be used in the control current amplifier. Therefore, the use of thyristors selected for extremely short unblocking time is unnecessary. It should be pointed out that the requirements relating to the slope steepness of the secondary current in the secondary windings $w1$, $w2$, $w3$ of the pulse transformer can be relaxed. In comparison to known circuit arrangements, this means that the output voltage of the control current amplifier $v$ in the circuit arrangement shown in FIG. 1 can be lower.

What is claimed is:

1. Apparatus for the simultaneous ignition of a plurality of series-connected thyristors comprising,
    a control amplifier the output of which is an alternating current,
    a pulse transformer, the primary windings of which are coupled to the output of said control amplifier,
    said transformer having a plurality of secondary windings,
    a plurality of full-wave rectifiers, one each coupled to said secondary windings, and having two output leads,
    a plurality of control circuits, one each coupled in the control path of each thyristor, each control circuit comprising,
        a storage reactance coil having a first lead coupled to the grid of the thyristor and a second lead coupled to one output lead of a full-wave rectifier, and
        an uncontrolled diode having its cathode coupled to said second lead of said storage reactance coil, and its anode coupled to the cathode of the thyristor and the other output lead of said rectifier.

2. The apparatus of claim 1 further comprising for each control circuit a circuit coupled in parallel with said reactance coil comprising a cutoff diode in series with the parallel connection of a capacitor and a resistor.

3. The apparatus of claim 1 further comprising for each full-wave rectifier,
    a parallel connection across its output lead comprising a charging capacitor and a discharge resistor, and
    a threshold value element coupled between the one rectifier output lead and said second lead of said storage reactance coil.

4. The apparatus of claim 3 wherein said threshold value element is a Zener diode.

5. The apparatus of claim 3 wherein said threshold value element is a series connection of diodes each connected to conduct current in the direction from the one full-wave rectifier output lead to the reactance coil.

6. The apparatus of claim 1 wherein cutoff resistors are connected in series with each of two output winding leads for each of said secondary transformer windings.

7. The apparatus of claim 2 further comprising for each full-wave rectifier,
    a parallel connection across its output lead comprising a charging capacitor and a discharge resistor, and
    a threshold value element coupled between the one rectifier output lead and said second lead of said storage reactance coil.

8. The apparatus of claim 7 wherein said threshold value element is a Zener diode.

9. The apparatus of claim 8 wherein said threshold value element is a series connection of diodes each connected to conduct current in the direction from the one full-wave rectifier output lead to the reactance coil.

10. The apparatus of claim 9 wherein cutoff resistors are connected in series with each of two output winding leads for each of said secondary transformer windings.

* * * * *